May 13, 1947. J. J. CARR 2,420,462
KNEE ACTION REAR WHEEL SUSPENSION
Filed March 7, 1945 3 Sheets-Sheet 1

INVENTOR.
JAMES J. CARR
BY
Victor J. Evans & Co.
ATTORNEYS

INVENTOR.
JAMES J. CARR

May 13, 1947.　　　　J. J. CARR　　　2,420,462
KNEE ACTION REAR WHEEL SUSPENSION
Filed March 7, 1945　　　3 Sheets—Sheet 3

INVENTOR.
JAMES J. CARR
BY
Victor J. Evans & Co.
ATTORNEYS

Patented May 13, 1947

2,420,462

UNITED STATES PATENT OFFICE 2,420,462

KNEE ACTION REAR WHEEL SUSPENSION

James J. Carr, Raleigh, N. C.

Application March 7, 1945, Serial No. 581,464

1 Claim. (Cl. 280—124)

This invention relates to a suspension for the rear wheels of an automobile or other motor vehicle and it is one object of the invention to provide a suspension mechanism of such formation that the rear wheels will be suspended independent of each other and permitted to have knee action when the vehicle is in motion. It will thus be seen that the car will be caused to ride very smoothly and excessive jolting eliminated.

Another object of the invention is to provide a suspension structure wherein the spindles carrying the rear wheels are connected with the rear axle by springs which serve very effectively to transmit rotary motion to the wheels and also permit the spindles and the wheels to have vertical movement relative to the axle when traveling over rough ground, there being springs provided for yieldably resisting such motion and absorbing vertical shocks and preventing jolting of the car.

Another object of the invention is to provide a suspension structure which is simple in construction, very strong, and not liable to get out of order or become broken when subjected to rough use.

The invention is illustrated in the accompanying drawings wherein.

Figure 1:
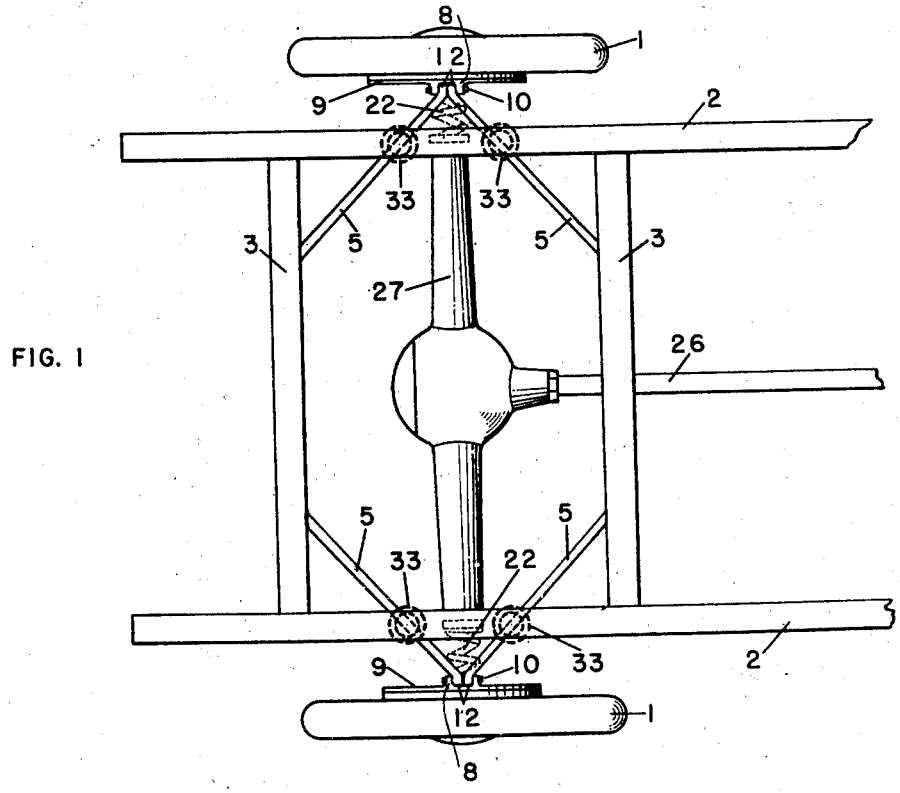
Figure 1 is a top plan view of the improved suspension mechanism.
Figure 2:
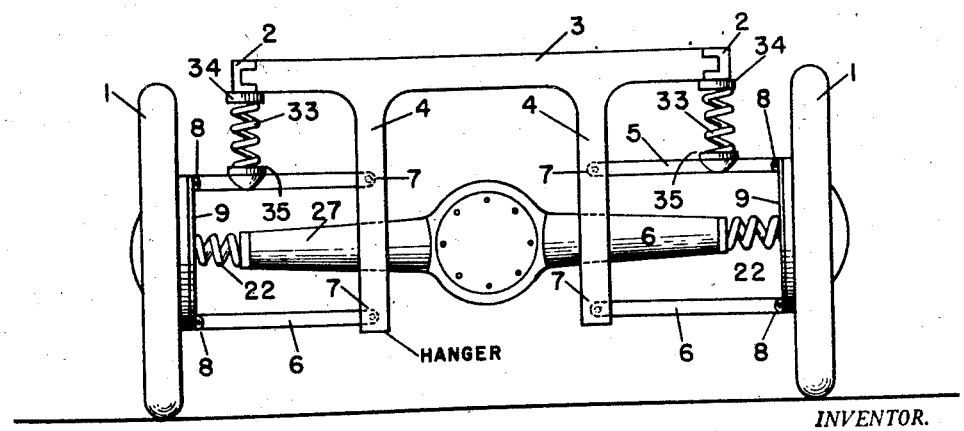
Figure 2 is a rear view thereof.
Figure 3:
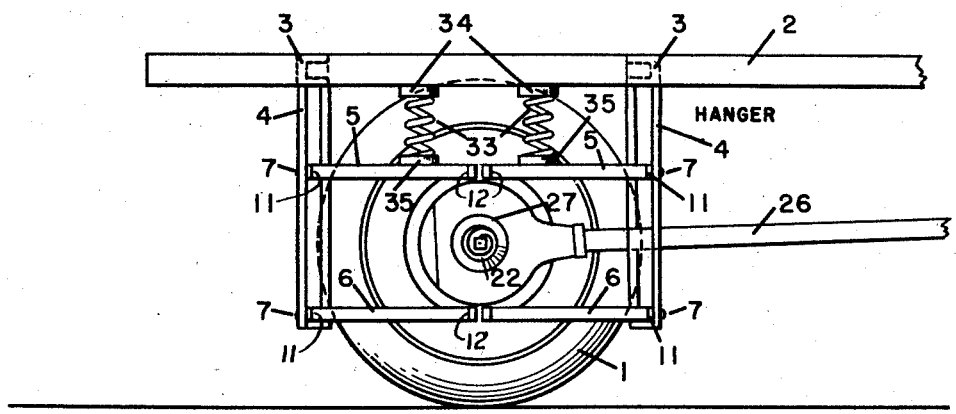
Figure 3 is a side view with the wheel at the near side removed.
Figure 4:
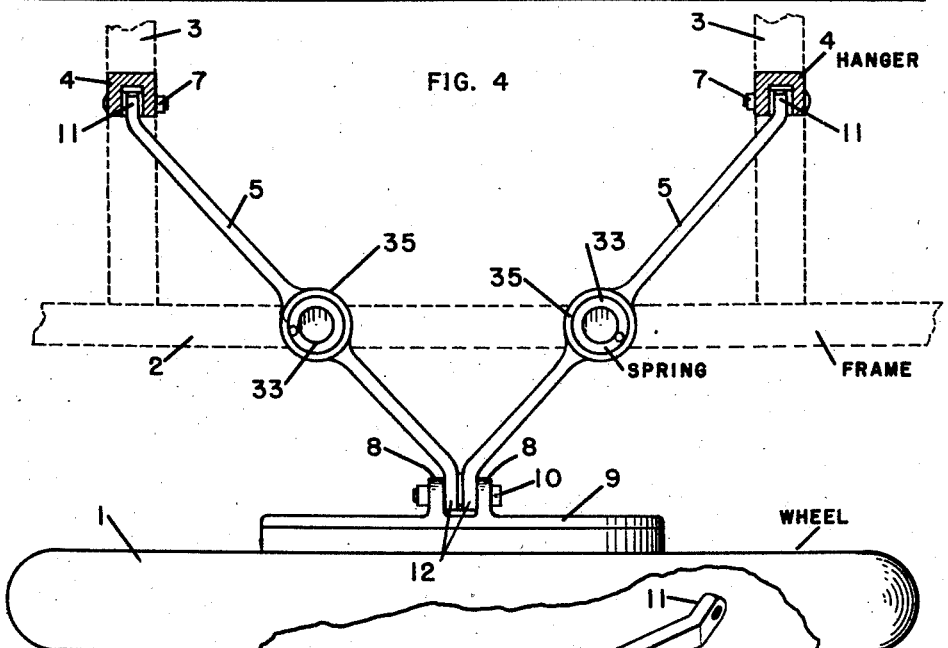
Figure 4 is a fragmentary view showing a portion of the suspension structure partially in plan and partially in section.
Figure 5:
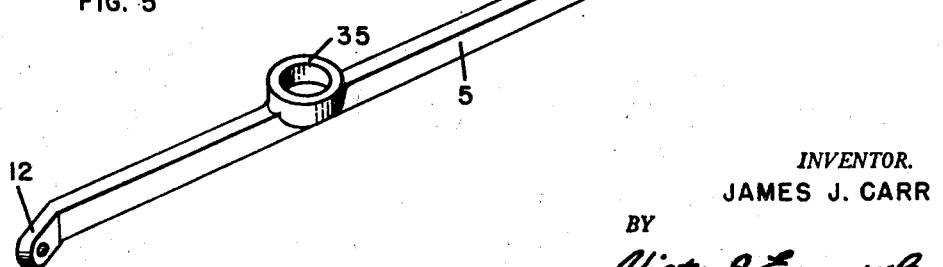
Figure 5 is a perspective view of one of the arms of the device.

This improved suspension mechanism constitutes means for supporting the rear wheels 1 of an automobile or other motor vehicle which has a chassis or frame 2. Cross bars 3 extend transversely of the chassis between side bars thereof and these cross bars carry hangers 4 which extend downwardly therefrom and are formed of channeled metal with their channels presented outwardly towards opposite sides of the vehicle. Upper and lower arms 5 and 6 are pivoted to the hangers in the channels thereof by bolts 7 which serve as pivot pins for the arms. Referring to Figures 1 and 4, it will be seen that the companion arms converge outwardly and at their outer ends, the arms are pivotally mounted between upper and lower ears 8 of brake plates 9 by bolts 10. The arms extend diagonally, but their inner and outer ends are bent to form terminal portions or ears 11 and 12 which are parallel to each other, and upon referring to Figure 4, it will be seen that the arms may have vertical swinging movement. When the arms swing vertically, the upper and lower arms remain parallel to each other and the plates 9 remain vertical.

Figure 6:
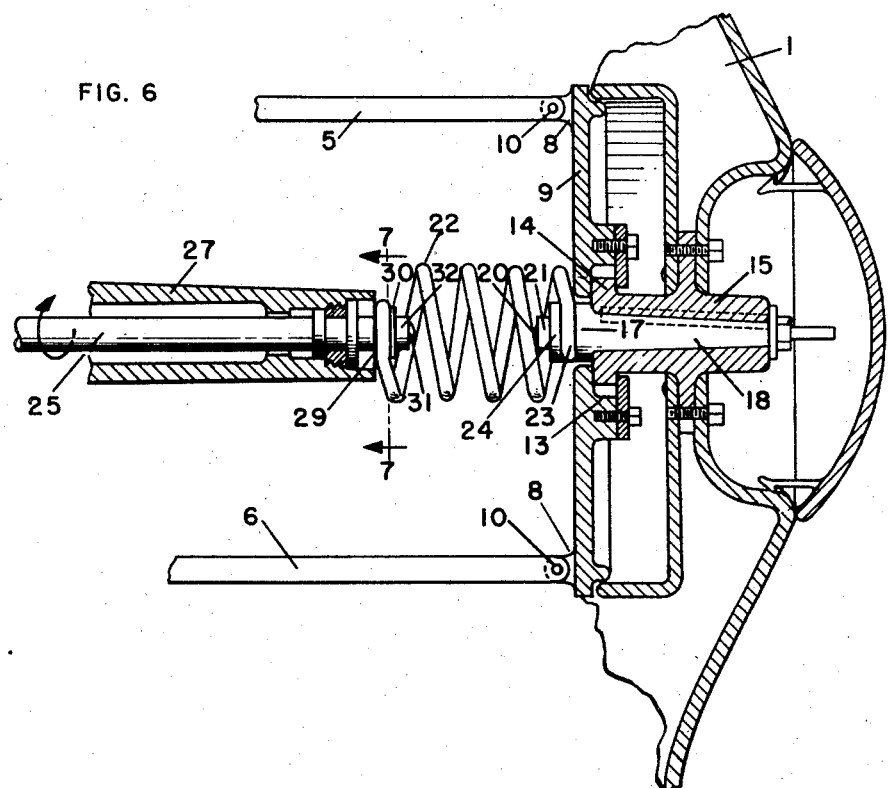
Figure 6 is a fragmentary sectional view upon an enlarged scale taken along the line 6—6 of Figure 2.
Figure 7:
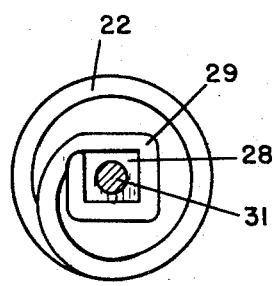
Figure 7 is a section taken along line 7—7 of Figure 6.
Figure 8:
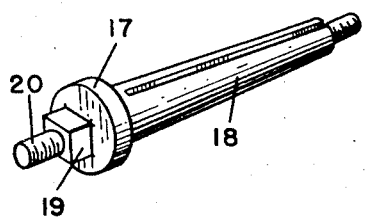
Figure 8 is a perspective view of a spindle.
Figure 9:
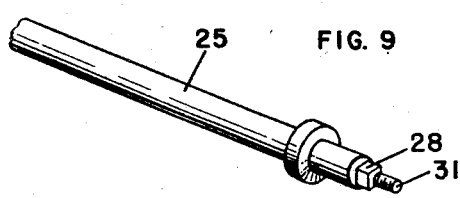
Figure 9 is a perspective view of the rear axle.

Each plate 9 is formed with a socket 13 to rotatably receive the enlarged inner end portion 14 of the hub 15 of a wheel 1. This is clearly shown in Figure 6, and referring to this figure, it will be seen that the socket 13 surrounds an opening 16 formed centrally of the plate 9 to receive the enlarged portion 17 of a spindle 18 for a wheel. Each spindle has a squared inner end portion 19 from which projects a threaded stem 20 to receive a nut 21 by means of which the outer end of a spring 22 is held in engagement with the spindle. The outer end of each spring 22 is formed with a squared portion 23 to fit closely about the squared portion 19 of the companion spindle so that the spindle will turn with the spring and after the spring has been applied to the spindle, a washer 24 is applied to the stem 20 so that when the nut 21 is screwed upon the stem the spring will be firmly held to the spindle. The spindles are in alinement with the rear axle 25 of the automobile which is rotated from the transmission shaft 26 in the usual manner and rotatably mounted in the usual rear axle casing 27. Ends of the axle are formed with squared portions 28 about which squares inner end portions 29 of the springs 22 fit and in order to firmly hold the springs in engagement with the axle a washer 30 is applied to the stem 31 projecting from each squared portion and a nut 32 then applied to hold the washer in tight clamping engagement with the washer. It will thus be seen that when the axle 25 is turning, rotary motion will be imparted to the two spindles and to the rear wheels which are keyed to the spindles. Since the spindles are connected with the axle by springs, they may have vertical movement relative to the axle and independent of each other and the wheels may follow irregularities in the ground over which the automobile is moving without imparting jolts to the car. When the wheels and the spindles move vertically relative to the axle, the arms 5 and 6 have vertical tilting movement from their inner and outer ends and in order to yieldably resist downward movement of the chassis there have been provided springs 33 which are disposed vertically between the upper arms 5 and the chassis bars and have their ends engaged in seats 34 and 35 which maintain them in the vertical position and prevent them from slipping out of place. The springs permit the chassis and the arms to have vertical movement relative to each other, but normally hold the chassis and the arms in horizontal position.

What is claimed is:

A wheel mount for vehicles including a frame, a brake plate having upper and lower ears attached thereto, a pair of vertically dependant hangers attached to the frame, an upper arm pivotally mounted upon each of the hangers and each normally extending horizontally to a pivotal connection with the upper ear, like lower arms likewise mounted and connected to the lower ear and compression springs mounted between the upper arms and the frame.

JAMES J. CARR.

REFERENCES CITED

The following references are of record in the file of this patent:

UNITED STATES PATENTS

| Number | Name | Date |
| --- | --- | --- |
| 2,163,981 | Lawrence | June 27, 1939 |
| 2,303,545 | Graham, Jr. | Dec. 1, 1942 |
| 2,052,064 | Whisenand | Aug. 25, 1936 |
| 2,198,099 | White | Apr. 23, 1940 |
| 2,067,807 | Williams | Jan. 12, 1937 |
| 2,314,076 | Casner | Mar. 16, 1943 |
| 1,897,542 | West | Feb. 14, 1933 |

FOREIGN PATENTS

| Number | Country | Date |
| --- | --- | --- |
| 98,185 | Austria | Nov. 25, 1924 |